United States Patent
Krapf et al.

(10) Patent No.: US 8,686,891 B2
(45) Date of Patent: Apr. 1, 2014

(54) LOCATING DEVICE

(75) Inventors: Reiner Krapf, Reutlingen (DE); Heiko Braun, Leinfelden-Echterdingen (DE); Michael Mahler, Leinfelden-Echterdingen (DE); Christoph Wieland, Stuttgart-Vaihingen (DE); Ulli Hoffmann, Niefern-Oeschelbronn (DE)

(73) Assignee: Robert Bosch GmbH, Stuttgart (DE)

( * ) Notice: Subject to any disclaimer, the term of this patent is extended or adjusted under 35 U.S.C. 154(b) by 224 days.

(21) Appl. No.: 12/809,923

(22) PCT Filed: Oct. 31, 2008

(86) PCT No.: PCT/EP2008/064806
§ 371 (c)(1),
(2), (4) Date: Sep. 15, 2010

(87) PCT Pub. No.: WO2009/083302
PCT Pub. Date: Jul. 9, 2009

(65) Prior Publication Data
US 2010/0328137 A1     Dec. 30, 2010

(30) Foreign Application Priority Data
Dec. 21, 2007   (DE) .......................... 10 2007 062 997

(51) Int. Cl.
*G01S 13/00* (2006.01)
(52) U.S. Cl.
USPC ............................. 342/22; 342/27; 342/188
(58) Field of Classification Search
CPC ........ G01S 13/885; G01S 13/89; G01S 13/88
USPC .................. 342/22, 27, 74, 75, 188, 191, 195
See application file for complete search history.

(56) References Cited

U.S. PATENT DOCUMENTS

| | | | |
|---|---|---|---|
| 4,746,867 A | 5/1988 | Gunton | |
| 5,130,711 A | 7/1992 | Kimura et al. | |
| 5,457,394 A * | 10/1995 | McEwan | 324/642 |
| 6,359,582 B1 * | 3/2002 | MacAleese et al. | 342/22 |
| 6,417,797 B1 * | 7/2002 | Cousins et al. | 342/179 |
| 6,600,441 B2 | 7/2003 | Liedtke et al. | |
| 6,657,577 B1 * | 12/2003 | Gregersen et al. | 342/22 |
| 7,345,617 B2 * | 3/2008 | Friborg et al. | 342/22 |
| 2002/0196177 A1 * | 12/2002 | Johansson et al. | 342/22 |
| 2007/0152866 A1 * | 7/2007 | Nelson | 342/22 |
| 2008/0231525 A1 | 9/2008 | Krapf et al. | |
| 2008/0291076 A1 * | 11/2008 | Skultety-Betz et al. | 342/22 |
| 2010/0117885 A1 * | 5/2010 | Holbrook et al. | 342/22 |

FOREIGN PATENT DOCUMENTS

| | | |
|---|---|---|
| EP | 1 850 121 | 10/2007 |
| WO | WO 03/025619 | 3/2003 |

* cited by examiner

*Primary Examiner* — John B Sotomayor
*Assistant Examiner* — Marcus Windrich
(74) *Attorney, Agent, or Firm* — Merchant & Gould P.C.

(57) ABSTRACT

The invention relates to a locating device, in particular a hand-guided locating device, with a locating unit (36) for detecting the presence of an object (16, 18) arranged in an examination object (14) by means of an examination signal (38), which has a polarization unit (50) provided for a procedure with the examination signal (38), and with a housing (20) for taking up the locating unit (36), which has a longitudinal axis (24). It is proposed that in at least one operating mode the polarization unit (50) specifies at least one first polarization plane (52, 54) aligned obliquely to the longitudinal axis (24).

23 Claims, 6 Drawing Sheets

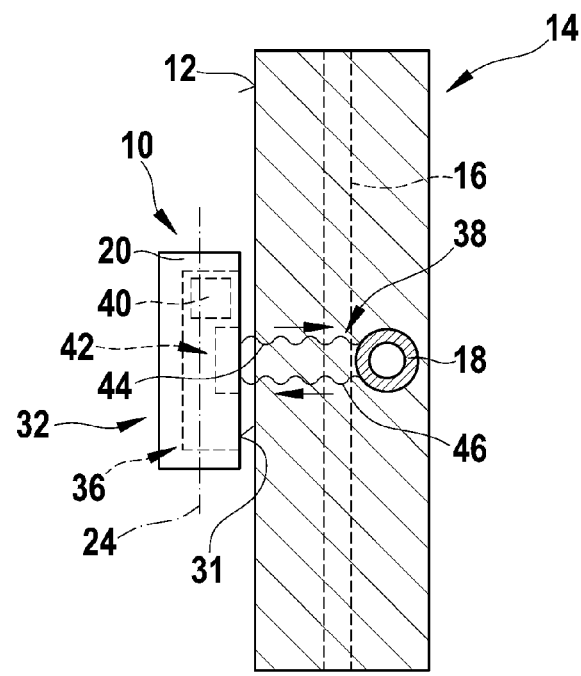
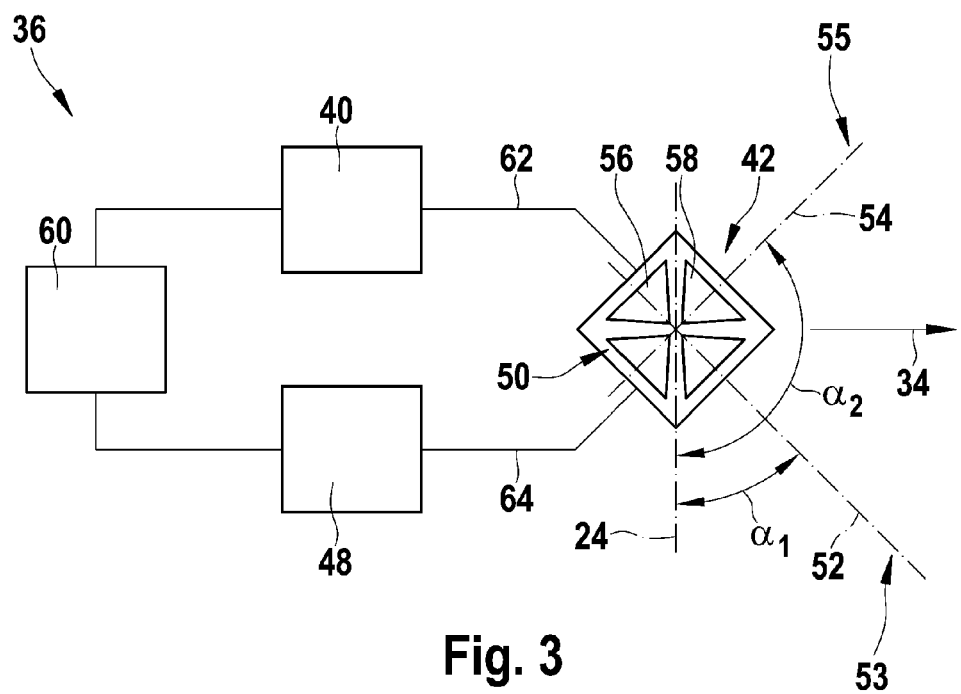

LOCATING DEVICE

This application is a National Stage Application of PCT/EP2008/064806, filed 31 Oct. 2008, which claims benefit of Serial No. 10 2007 062 997.6, filed 21 Dec. 2007 in Germany and which applications are incorporated herein by reference. To the extent appropriate, a claim of priority is made to each of the above disclosed applications.

BACKGROUND

The invention is based on a locating device according to the generic term of claim 1.

A hang-guided locating device, which is provided for invisible objects that are arranged in an examination object by means of an emission of an examination signal, has already been suggested. It provides a housing, which is manually moved by an operator along a surface. The locating device comprises furthermore a polarization unit, which is provided for a polarization of the examination signal.

SUMMARY

The invention is based on a locating device, in particular a hand-guided locating device, with a locating unit for detecting the presence of an object arranged in an examination object by means of an examination signal, which has a polarization unit provided for a procedure with the examination signal, and with a housing for taking up the locating unit, which has a longitudinal axis.

It is suggested that that in at least one operating mode the polarization unit specifies at least one first polarization plane, which is aligned obliquely to the longitudinal axis. Thereby the precision can be advantageously increased during an analysis process of the examination signal by reducing undesired interference factors. The examination signal is in particular a high frequency electromagnetic signal. This shall be understood as an electromagnetic signal, which provides a frequency of at least 500 MHz, as for example a radar signal. The "procedure with" the examination signal means in particular a transmitting procedure, a receiving procedure and/or further operating procedures for processing the examination signal that seem to be useful for the expert. "Provided" shall in particular mean customized, equipped and/or programmed.

If the housing is elongated, as for example in a quadrangular form, the longitudinal axis corresponds with the main extension direction or the longitudinal direction of the housing. The longitudinal axis of the housing is preferably aligned parallel to the surface of the examination object during the locating procedure. The housing furthermore provides particularly a preferred side, which is facing the surface of an examination object during a locating procedure. The longitudinal axis can hereby be understood as main extension direction of this side. If the side is construed as a square, the longitudinal axis shall be understood as a median of the side. The longitudinal axis can furthermore be marked by a marking means that is attached to the housing, as for example a notch or an arrow.

A polarization plane, which is aligned "obliquely" to the longitudinal axis shall mean a polarization plane, whose normal direction is aligned obliquely to the longitudinal axis. An oblique alignment of two directions toward each other shall mean an alignment, which deviates from the parallelism and the orthogonality. The directions that are aligned obliquely to each other particularly create an acute angle.

It is particularly advantageous if the locating device is construed as a hand-guided locating device, which serves in particular for locating objects in a wall or in the floor. At the examination of a wall the longitudinal axis corresponds hereby typically and in particular according to instructions with the horizontal or the vertical direction. The locating device is in particular provided to locate objects, which provide a defined main extension direction or alignment, as in particular elongated objects, for example conductions. At typical operating conditions, in particular according to instructions, there is a relation between the longitudinal axis of the locating device and a typical alignment of objects in the examination object. Due to the invention a preferred relation of the polarization plane is advantageously created to typical alignments of objects in the examination object over the alignment of a polarization plane relatively to the longitudinal direction. It can in particular be achieved by the invention that at least one polarization plane is aligned relatively obliquely towards horizontally and vertically directed objects in the wall during the examination of a wall.

It is furthermore proposed that the locating device provides a grip element for a gripping by an operator during a locating procedure, which is coupled with the housing, whereby a hand-guided locating device can be realized that is easy to use. A "grip element" shall in particular be understood as a means, which is provided to be encompassed by an operator under operating conditions according to instructions. The grip element can in particular be a component different from the housing, which is directly coupled at the housing, and/or it can be formed at the housing in one piece. The grip element can furthermore correspond with the housing, which is encompassed by a hand of the operator during a locating procedure.

It is suggested in a preferred embodiment of the invention that the polarization plane creates an angle of ca. 45° with the longitudinal axis. Thereby an orientation of the polarization can be achieved, which is advantageously adjusted to common alignments of objects in an examination object, as in particular conductions in a wall or under a floor. It qualifies in particular for locating objects in the examination object, which are aligned parallel or orthogonally to the longitudinal axis of the locating device. An angle, which is created by a plane and a direction, shall in particular be understood as the angle, which is created by the direction and the orthogonal projection of the direction in the plane. An angle, which is created by a plane and a direction, can furthermore be understood as an angle, which is created by the direction and the normal direction to the plane. An angle, which amounts to "ca. 45°", shall furthermore be understood as an angle, which deviates maximally by 10%, advantageously maximally by 5% from 45°.

It is furthermore suggested that the polarization plane is a transmitting polarization plane in at least one operation mode, which is assigned to at least one transmitting channel for transmitting the examination signal. A "transmitting signal" shall in particular be understood as a means or a collection of means, in particular electric conductions and/or electronic function components, which serve for the conversion of the examination signal into an electromagnet wave based on the output of a signal generating unit, which serves for generating the examination signal in an electric form. The transmitting channel provides hereby at least one transmission antenna arrangement with at least one antenna and can additionally provide further means, which are provided for the processing of the examination signal in between its generation by the signal generating unit and its emission with the aid of the transmission antenna arrangement. The polarization unit provides advantageously a polarization means, which serves together with the transmission antenna arrangement for the generation of an examination signal that is polarized in the transmission polarization plane. The polarization means can be different from the transmission antenna arrangement—for example construed as a filter—or it can be construed preferably in one piece with the transmission antenna arrangement, whereby a transmission antenna, which is for example construed as dipole antenna, specifies the transmission polarization plane by its construction.

It is furthermore suggested that the polarization plane is a receiving polarization plane in at least one operation mode, which is assigned to a receiving channel for receiving the examination signal. A "receiving channel" shall be understood as a means or a collection of means, in particular electric conductions and/or electronic function components, which serve for receiving the examination signal and in particular for processing the examination signal into a form that is suitable for an analysis unit. The receiving channel provides thereby at least one receiving antenna arrangement and can additionally provide further means, which are provided for processing the examination signal in between its reception and its analysis. The polarization unit provides advantageously a polarization means, which serves together with the receiving antenna arrangement for the reception of at least one part of the examination signal in the receiving polarization plane. The polarization means can be different from the receiving antenna arrangement—it can for example be construed as a filter—or it can be construed in one piece with the receiving antenna arrangement, whereby a receiving antenna—for example a dipole antenna—specifies the receiving polarization plane by its construction. The receiving antenna arrangement can be construed differently from a transmission antenna arrangement. Preferably the receiving antenna arrangement is construed identically with the transmitting antenna arrangement.

It is suggested in a preferred embodiment of the invention that the polarization unit specifies at least a second polarization plane, which is different from the first polarization plane, whereby an increased flexibility and an increased information density can be achieved.

In this context it is suggested that one of the polarization planes is a transmitting polarization plane in at least on operation mode, which is assigned to at least one transmitting channel for the transmission of the examination signal, and another of the polarization planes is a receiving polarization plane, which is assigned at least to one receiving channel for the reception of the examination signal. That way a particularly advantageous analysis process of the examination signal can be achieved by receiving the examination signal in a receiving polarization plane that is different from the transmitting polarization plane. At a locating procedure typically an essential part of the emitted examination signal is reflected at the surface of the examination object, whereby this part that is reflected in the transmitting polarization plane hits the locating device again. Due to an aimed reception and a subsequent analysis of a part of the examination signal in a receiving polarization plane that is different from the transmitting polarization plane interference effects that have been caused by the reflected part, as for example an overlapping of a wanted signal that carries a relevant location information, can be avoided. The feature of objects to rotate the polarization plane of a wave that is hitting the object, which is provided by the material and/or the construction, is thereby advantageously used. Due to the oblique arrangement of the transmitting polarization plane and/or the receiving polarization plane relative to the longitudinal axis a particularly effective locating of objects in the examination object can be hereby achieved, which is—as realized in most cases—aligned parallel or orthogonally towards the longitudinal axis.

In a particular embodiment of the invention it is proposed that the polarization planes are arranged orthogonally to each other, whereby an advantageous symmetry can be achieved at the process with the examination signal.

According to a further embodiment of the invention it is suggested that the polarization planes are arranged obliquely to each other. Thereby an effective locating of objects can be achieved, whose alignment in the examination object basically corresponds with the oblique alignment of one of the polarization planes.

It is furthermore suggested that the second polarization plane is aligned parallel or orthogonally to the longitudinal axis, whereby an effective locating in a wide application area can be achieved.

A particularly high application flexibility can furthermore be achieved, if the polarization unit provides a rotation means, which is provided to rotate the alignment of at least one polarization plane relatively to the longitudinal axis. The rotation means can be provided for a mechanically and/or electrically controlled drive. It can be construed as engine or as a further drive means that appears to be useful for the expert.

Furthermore the application comfort can be increased, if the locating device provides a chassis, which is provided to guide the locating device over a surface of the examination object in a preferred moving direction, whereby the polarization plane is arranged obliquely relative to the preferred moving direction. The preferred moving direction is in particular aligned vertically to the longitudinal axis of the housing.

The invention is furthermore based on a procedure for locating an object that is arranged in the examination object with a locating device, at which a housing of the locating device is moved along a surface of the examination object.

It is suggested that an examination signal that is polarized in a transmitting polarization plane is transmitted into the examination object, whereby the transmitting polarization plane is aligned obliquely to a longitudinal axis of the housing. Thereby the precision can be advantageously increased during an analysis process of the examination signal by reducing undesired interference factors.

In a preferred embodiment of the invention it is suggested that the examination signal is received in at least one receiving polarization plane that is different from the transmitting polarization plane. Thereby a particularly advantageous analysis process of the examination signal can be achieved by receiving the examination signal in a receiving polarization plane that is different from the transmitting polarization plane. By an aimed reception and a subsequent analysis of a part of the examination signal in a receiving polarization plane that is different from the transmitting polarization plane interfering effects that are caused by the reflected part of the examination signal, as in particular an overlapping of a wanted signal that carries relevant locating information by the reflected part, can be advantageously avoided.

A high information density can furthermore be achieved if the examination signal is received in several receiving polarization planes that are different from the transmitting polarization plane. The procedure can thereby be furthermore adjusted to different alignments of objects in the examination object.

It is furthermore suggested that the examination signal is received in the transmitting polarization plane. Thereby an effective locating of objects can be achieved, which cause no rotation of a wave that hits them.

It is furthermore suggested that the examination signal is received in the transmitting polarization plane and in at least one receiving polarization plane that is different from the transmitting polarization plane, whereby an effective locating in a wide application area can be achieved.

In this context further locating information can be advantageously gained, if the examination signal is received in the transmitting polarization plane and in several receiving polarization planes that are different from the transmitting polarization plane.

BRIEF DESCRIPTION OF THE DRAWINGS

Further advantages arise from the following drawing description. The drawing shows embodiments of the invention. The drawing, the description and the claims contain several characteristics in combination. The expert will usefully consider these characteristics individually and summarize them to further useful combinations.

It is shown in.

DETAILED DESCRIPTION

Figure 1:
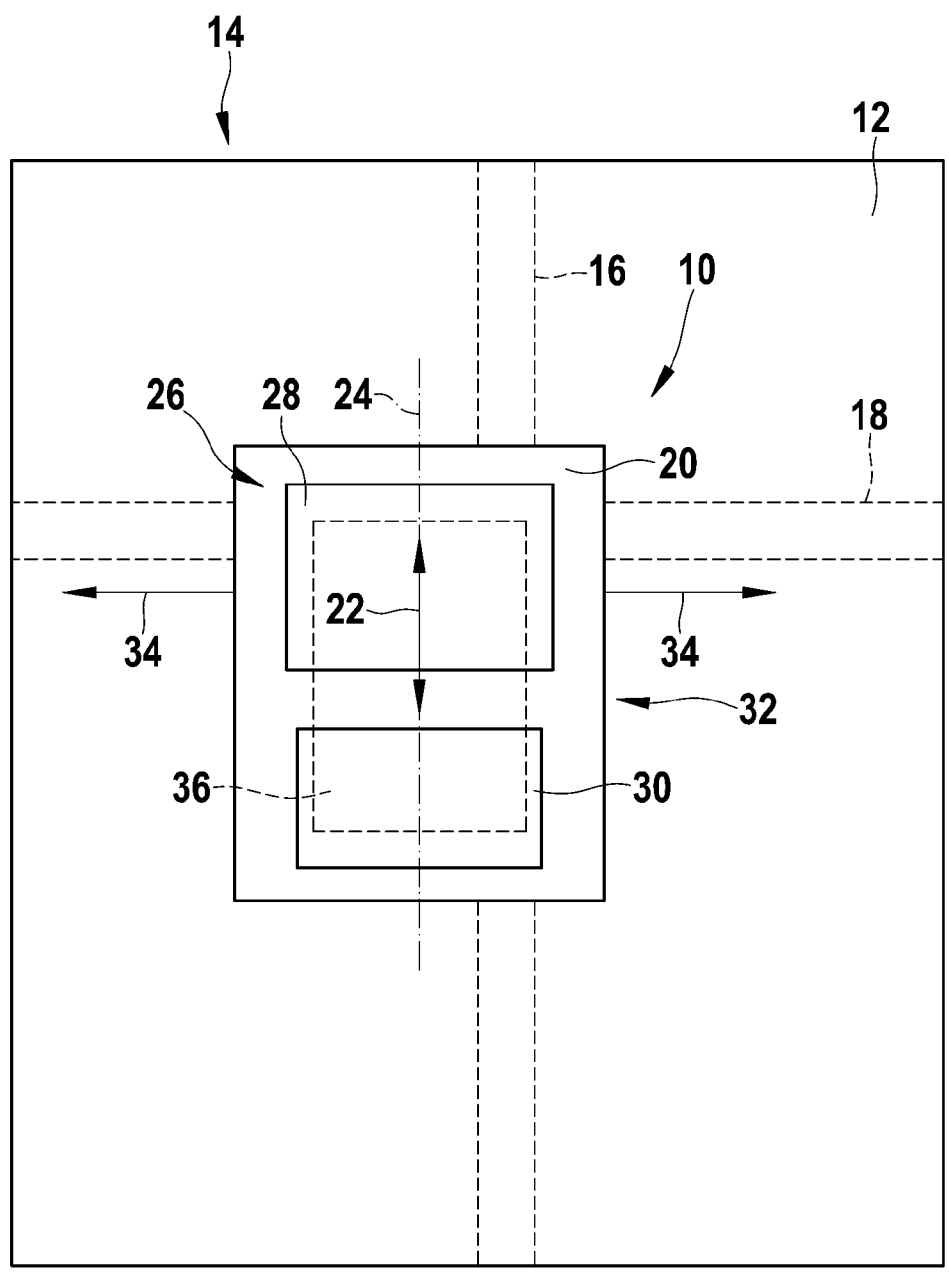
FIG. 1 a locating device, which is moved along a surface of a wall that has to be examined, FIG. 2 the arrangement of the locating device in front of the wall in a side view, FIG. 3 a schematic illustration of a locating unit of the locating device with an antenna arrangement, FIGS. 4a to 4c explanatory drawings for describing different locating modes, FIG. 5 the arrangement of three polarization planes in a locating mode, FIG. 6 the arrangement of two polarization planes that are oblique to each other in a further locating mode and FIG. 7 the locating device in an alternative embodiment with a chassis.

FIG. 1 shows a hand-guided locating device 10, which is moved along a surface 12 of an examination object 14 by a not further shown operator. The examination object 14 is construed as a wall, in which objects 16, 18 are arranged that are invisible for the operator and which have to be located. The object 16 is construed as water conduit, which runs vertically in the wall, while the object 18 corresponds with an electric main, which is aligned horizontally. Alternatively the examination object 14 can be construed as a floor that has to be examined. The objects 16, 18 are hereby aligned horizontally and for example parallel to a length or width of a room.

The locating device 10 provides a housing 20, which is basically construed quadrangular. The housing 20 provides a longitudinal direction, which is called main extension direction 22 and which corresponds with the direction of the length of the cuboid that is building the housing 20. The main extension direction 22 is furthermore characterized by the longitudinal axis 24 of the housing, which is aligned parallel to the main extension direction 22 and which contains the center of mass of the locating device 10. The longitudinal axis 24 can furthermore be an axis that is aligned parallel to the main extension direction 22, which contains an edge of the housing 20. In the housing 20, namely integrated in an operator side 26, there are furthermore a display unit 28 that is construed as LCD display and an input unit 30, which provides at least one pushbutton. The housing 20 furthermore provides a preferred side 31, which is arranged on the opposite of the operator side 26 and which is facing an examination object during a locating process (see FIG. 2). The "longitudinal axis" 24 shall be understood as the main extension direction, which means the longitudinal direction, of the side 31. If the side 31 is quadrangular a "longitudinal axis" shall be understood in particular as a median of the side 31. If the housing 20 has a circular symmetry, in which the operator side 26 and the side 31 are construed disc-shaped, the "longitudinal axis" corresponds with a preferred direction of the housing, which is for example specified by a mark, a labeling of the housing or by a direction of viewing of a display unit.

For moving the locating device 10 along the surface 12 the housing 20 is held in a hand by an operator. The housing 20 is hereby a grip element 32, which is encompassed by a hand of an operator for holding the locating device 10 during the movement along the surface 12. Alternatively or additionally a grip element 20 can be attached formed in one piece at the housing 20. The locating device 10 provides furthermore preferred moving directions 34 for the movement of the housing 20 along the surface 12. Those preferred moving directions 34 are defined relatively to the longitudinal axis 24 of the housing 20, in fact they are aligned vertically to the longitudinal axis 24 of the housing 20.

FIG. 2 shows the arrangement of the locating device 10 in front of the examination object 14 that has to be examined in a side view. For carrying out a locating process the locating device 10 provides a locating unit 36, which is arranged within the housing 20. It is schematically shown in FIGS. 1 and 2. The locating unit 36 is provided to detect the presence of the objects 16, 18 that are arranged in the examination object 14. This takes place in a familiar way by means of an examination signal 38, which is construed as high frequency electromagnetic signal, in particular as radar signal. The examination signal 38 is created in a first step by an electronic signal generating unit 40. It is transferred over a transmitting channel (see FIG. 3) to an antenna arrangement 42, which serves for the emission of the examination signal 38. The antenna arrangement 42 serves hereby as transmission unit, which transmits the examination signal 38 as transmission signal 44 into the examination object 14. This transmission signal 44 is reflected by at least one of the objects 16, 18 and received as receiving signal 46 by the antenna arrangement 42 that is construed as receiving unit.

The locating device 36 is closer illustrated in a detailed view in FIG. 3, namely with the arrangement of the signal generating unit 40 and the antenna arrangement 42. The receiving signal 46 that has been received by the antenna arrangement 42 is transferred to an analysis unit 48, which is provided for its analysis. Information about the position, in particular the depth in the examination object 14, the dimensions and the type of objects 16, 18 can be gained from an analysis process. The locating unit 36 provides furthermore a polarization unit 50, which is provided for processes with the examination signal 38. It specifies in particular two polarization planes 52, 54, which are different from each other, and into which the examination signal 38 is transmitted and/or received. The different combinations of transmitting- and receiving modes in the polarization planes 52, 54 are further explained below. The polarization planes 52, 54 are schematically illustrated by dotted lines in FIG. 3. The polarization unit 50 can be a unit that is separated from the antenna arrangement 42, which is downstream of the antenna arrangement 42. The polarization unit 50 can hereby be construed as filter unit. In a preferred embodiment, which is illustrated in FIG. 3, the polarization unit 50 is construed in one piece with the antenna arrangement 42. The polarization planes 52, 54 are hereby provided by the alignment of the antennas 56, 58, which are construed particularly as dipole antennas with a preferred emission plane, which corresponds with the desired polarization plane. The locating unit 36 provides furthermore a control unit 60, which is provided for carrying out at least one locating mode. The control unit 60 is therefore provided with a not further illustrated arithmetic unit and with a storage unit, which stores control demands that have to be carried out by the arithmetic unit. The control unit 60 is in an operational connection with the signal generating unit 40 and with the analysis unit 48 for implementing the locating mode.

According to the invention at least one of the polarization planes 52, 54 that is specified by the polarization unit 50 is arranged obliquely relative to the longitudinal axis 24 in at least one locating mode of the control unit 60. In the shown embodiment the polarization planes 52, 54 are arranged relatively orthogonally to each other. The polarization plane 52, 54 creates an angle $\alpha 1=45°$ or $\alpha 2=135°$ with the longitudinal axis 24. The polarization planes 52, 54 are hereby also aligned obliquely to the preferred moving direction 34, in fact they create an angle of 45° or 135° with the preferred moving direction 34.

In a first locating mode, which is carried out by the control unit 60, the polarization plane 52 is assigned to a transmitting channel 62, over which the examination signal 38 is transmitted as transmitting signal 44, whereby the polarization plane 52 is called transmitting polarization plane 53. Thereby the transmitting signal 44 is construed as polarized signal, whose polarization plane corresponds with the transmitting polarization plane 53. This is thereby achieved, in that the transmitting channel 62 is in an operation connection with the antenna 56. The transmitting signal 44 is then transmitted in a polarization plane, which is aligned relatively oblique to the longitudinal axis 24 and to the main extension direction 22.

The transmitting signal 44 that has been polarized in the transmitting polarization plane 53 hit therefore the objects 16, 18 with a polarization plane, which is oblique to the alignment of the objects 16, 18. It is assumed, that the objects 16, 18 provide the feature to rotate these polarization planes. The receiving signal 46 that is hereby excited is received by the antenna arrangement 42. Thereby the polarization plane 54 is assigned to a receiving channel 64, whereby the polarization plane 54 is called receiving polarization plane 55. Thereby a signal part of the receiving signal 46 is analyzed in the receiving polarization plane 55 by the analysis unit 48. This is thereby achieved, in that the receiving channel 64 is in an operational connection with the antenna 58. Due to this receiving process in a polarization plane 55, namely the receiving polarization plane 55, which is different from the transmitting polarization unit 53, the part of the examination signal 38 is received and subsequently analyzed, whose polarization is rotated by the objects 16, 18. The part of the examination signal 38, which provides and unaltered polarization in the transmitting polarization plane 53 and which is mostly excited by a reflection on the surface 12 of the examination object 14, is not present in the receiving channel 64, whereby an undesired overlapping of the wanted signal, which is generated by the part in the receiving polarization plane 55, is avoided. This wanted signal, which carries the desired locating information, can subsequently be analyzed with a high accuracy by the analysis unit 48. If the polarization unit 50 is construed as a filter unit it provides a filter, which is transparent for a signal part of the examination signal 38 that is arranged in the polarization plane 54. Thereby further signal parts, in particular a signal part in the transmitting polarization plane 53, are at least mostly suppressed, in particular completely suppressed.

Figure 4A:
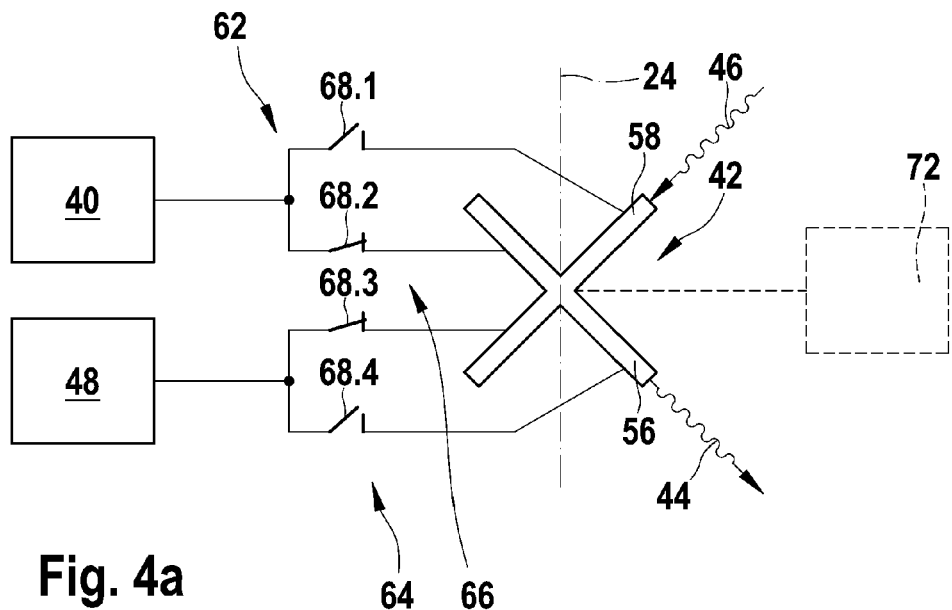
Figure 4B:
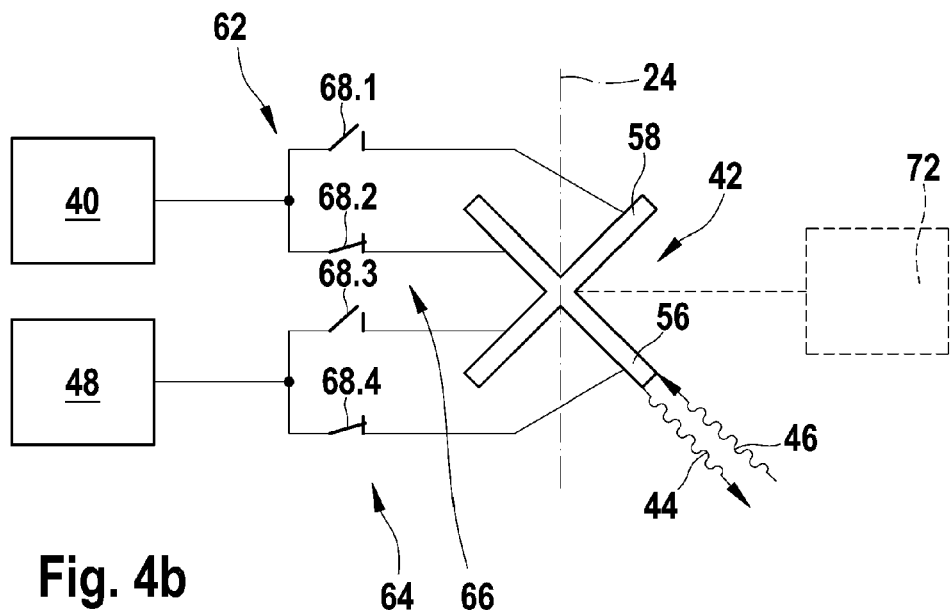
Figure 4C:
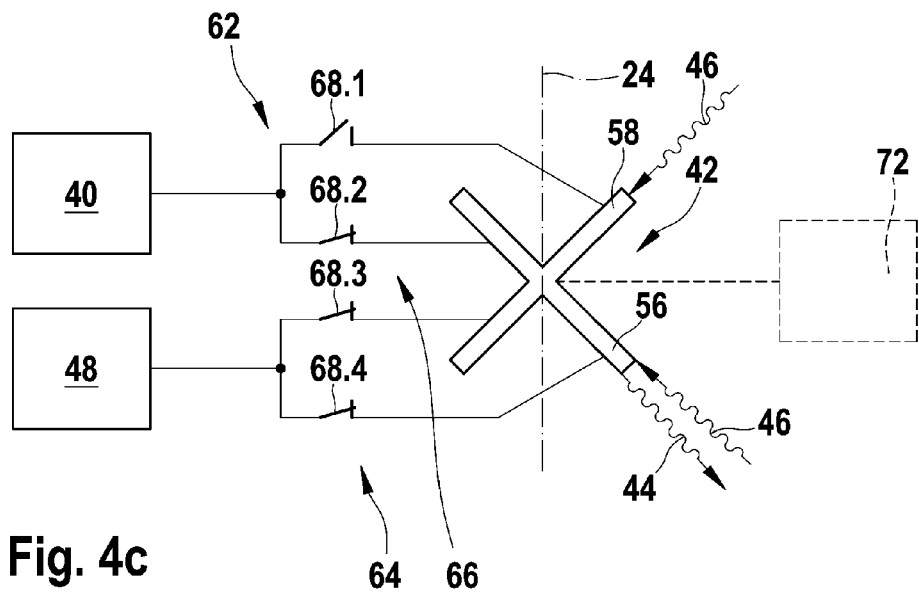

FIGS. 4a, 4b, 4c shows the signal generating unit 40, the analysis unit 48 and the antenna arrangement 42. The transmitting channel 62 is in an operational connection with the signal generating unit 40, while the receiving channel 64 is in an operational connection with the analysis unit 48. The implementation of different locating modes is schematically described with the aid of a assignment unit 66, which is provided to assign the antenna 56 and/or the antenna 58 to the signal generating unit 40 or the analysis unit 48. It shall thereby be noticed that this illustration serves for the explanation of the different locating modes and is not directed to a preferred construction of the locating unit 36. This assignment unit 66 is for example conveniently construed as switching unit, which provides switches 68. The transmitting signal 44 is also schematically illustrated and there are only parts of the receiving signal 46 shown, which are used for the analysis, in order to clarify the principle.

FIG. 4a shows the above described locating mode. The signal generating unit 40 is hereby assigned to the antenna 56, so that the transmitting channel 62 encompasses this antenna 56. Furthermore the analysis unit 48 is assigned exclusively to the antenna 58, so that the receiving channel 64 encompasses the antenna 58. With the aid of the switch 68.4 the receiving channel 64 is separated from the antenna 56 and therefore from the transmitting channel 62. With the aid of the assignment unit 66 different configurations can be achieved. A reversion of the above described configuration can for example be achieved by assigning the antenna 56—and therefore the polarization plane 52—to the receiving channel 64, while the antenna 58—and therefore the polarization plane 54—is assigned to the transmitting channel 62.

A further locating mode, which is shown in FIG. 4b, provides the exclusive analysis of a part of the examination signal 38, which is polarized in the transmitting polarization plane 53. This locating mode is thereby realized, in that the receiving channel 64 is put in an operational connection with the antenna 56, which—as described above—serves for transmitting the examination signal 38 in the transmitting polarization plane 53, with the aid of the switch 68.4 and separated from the antenna 58 with the aid of switch 68.3. A reception of the examination signal 38 in the transmitting polarization plane 53 qualifies especially for locating objects, which have insufficient or no influence at all on the polarization of a wave, which hits them, as for example for locating plate-type metal objects.

It is provided in a further locating mode, which is shown in FIG. 4c to analyze a part of the examination signal 38 in the polarization plane 54 in addition to the receiving process that is described in the locating mode of FIG. 4b. The receiving channel 54 is hereby in an operational connection with the antenna 56 as well as with the antenna 58. A locating mode is hereby carried out, whereby an examination signal 38 is transmitted in the transmitting polarization plane 53 and received in this transmitting polarization plane 53 as well as in the receiving polarization plane 55.

In further embodiments of these locating modes a transmitting process and a receiving process can take place simultaneously, or the receiving process and the transmitting process can take place separated from each other in time.

The above described locating modes, in which the polarization planes 52, 54 are construed obliquely to the longitudinal axis 24, qualify especially for locating objects, which are parallel or orthogonal to a reference direction of the examination object 14. Such a reference direction is for example the horizontal or the vertical direction at a wall or a room length or a room width at a floor. In order to achieve an effective locating in the case of a relatively oblique arrangement of an object of the examination object 14 to this reference direction the following embodiments of locating modes are suggested by means of the polarization unit 50.

Figure 5:
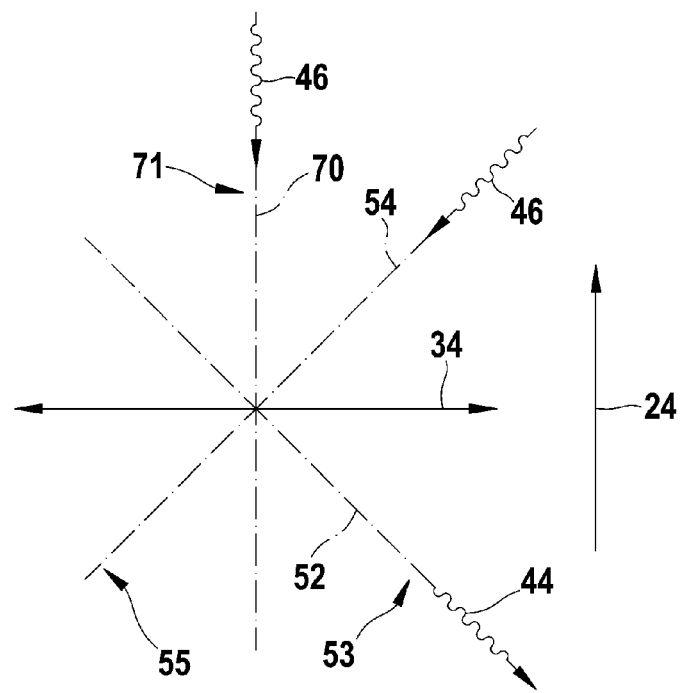

FIG. 5 shows a further locating mode, at which the polarization unit 50 specifies more than two polarization planes. In addition to the polarization planes 52, 54 that are shown in FIG. 3 the polarization unit 50 specifies a further polarization plane 70, which is arranged relatively oblique to the polarization planes 52, 54. The polarization plane 70 can for example be aligned parallel to the longitudinal axis 24. In a further embodiment it can be aligned orthogonally to the longitudinal axis 24. As described above, the polarization planes 52, 54 qualify for locating objects in the examination object 14, which are parallel or orthogonal to a reference direction of the examination object 14, and the polarization plane 70 can advantageously be used for locating objects, which are aligned relatively oblique to this reference direction, in particular with an angle of 45°. According to the embodiment from FIG. 5 a locating mode is provided, in which the examination signal 38 is transmitted in one of the polarization planes 52, 54, 70, and in which two further polarization planes are received. A configuration is exemplary shown, in which the transmitting signal 44 is transmitted in the polarization plane 52, which builds the transmitting polarization plane 53, and the receiving signal 46 is received in the polarization plane 54, which builds the receiving polarization plane 55, and in the polarization plane 70, which builds a polarization plane 71. Furthermore a further locating mode is provided, at which a reception of the receiving signal 46 in the transmitting polarization plane 53 takes additionally place.

Figure 6:
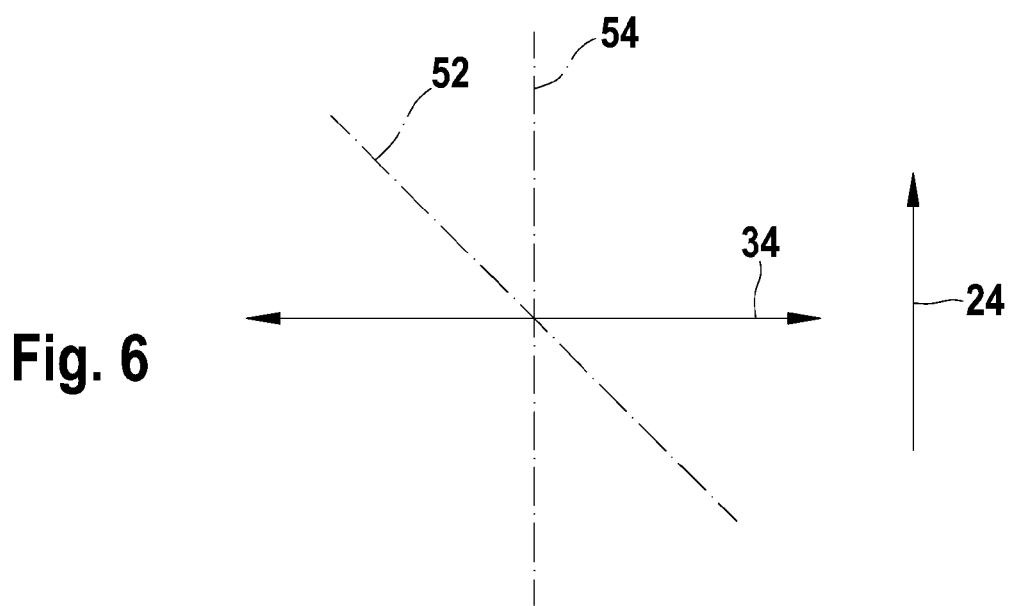

A locating mode that is shown in FIG. 6 can be provided in order to align the polarization planes 52, 54 obliquely to each other. The polarization plane 52 can for example be aligned obliquely with an angle of 45° to the longitudinal axis 24, like in the configuration in FIG. 3, whereby the polarization plane 54 creates an acute angle with the polarization plane 52. The polarization plane 54 can in particular be aligned parallel to the longitudinal axis 24 as it is exemplary illustrated in the figure.

These locating modes of FIGS. 3, 5 and 6 can be determined by different antenna arrangements. In a further embodiment, which is shown in FIGS. 4a, 4b and 4c, a rotation means 72 can be provided, which serves for rotating the alignment of at least one of the polarization planes 52, 54 towards the longitudinal axis 24. This rotation means 72 can optionally be built into the locating device 10, which is emphasized in FIGS. 4a, 4b and 4c by the dotted lines. It is particularly construed as actuator and can be controlled by the control unit 60.

Figure 7:
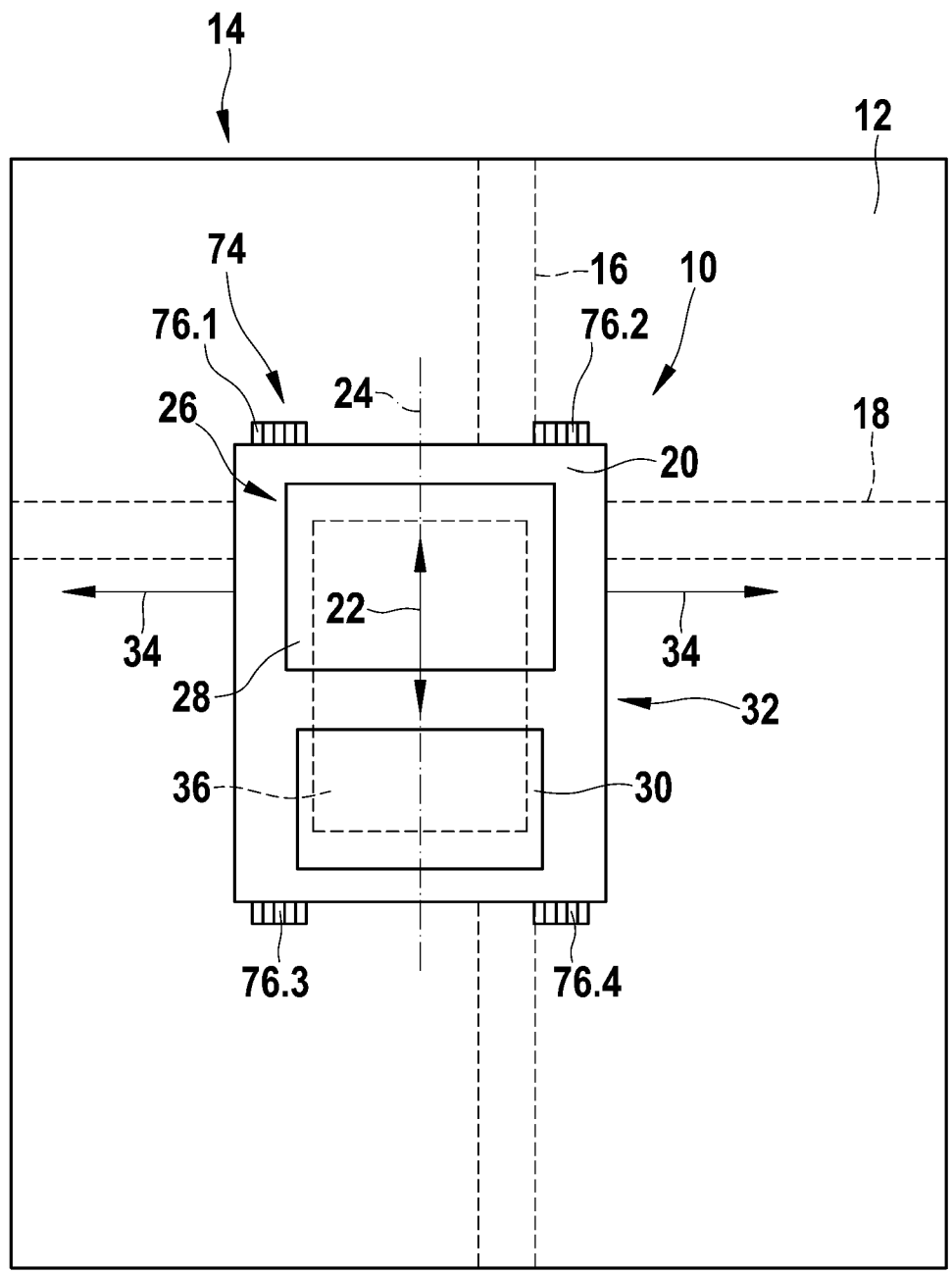

FIG. 7 shows an alternative embodiment of the locating device 10 from FIG. 1. Components that remain the same are thereby labeled with the same reference signs, whereby only the differences to the above described embodiment is explained in order to avoid repetitions. The locating device 10 in the embodiment of FIG. 7 provides a chassis 74, which is provided for guiding the housing 20—and therefore the locating unit 36 that is arranged in it—along the surface 12 of the examination object 14 in the preferred moving direction 34. The preferred moving direction 34 in this embodiment is specified by the chassis 74. The chassis 74 provides four wheels 76, which roll along the examination object 14 on its surface 12 during a movement. The chassis 74 is assigned to a not further shown pathway sensor device, which serves for the detection of the distance that housing 20 has made.

The invention claimed is:

1. A hand-held locating device, comprising:
a locating unit for detecting the presence of an object in an examination object by means of an examination signal;
a quadrangular housing for containing the locating unit, the locating unit comprising a polarization unit provided for a procedure with the examination signal;
an analysis unit for analyzing a received signal; and
a longitudinal axis of the housing,
wherein in at least one operating mode the polarization unit specifies a first polarization plane aligned obliquely to the longitudinal axis;
wherein the polarization unit provides a rotation means, which is provided to selectively set the alignment of at least one polarization plane relative to an axis;
wherein the polarization unit provides at least a second polarization plane, which is different from the first polarization plane;
wherein in at least one operating mode one of the polarization planes is a transmitting polarization plane, which is assigned to at least one transmitting channel for transmitting the examination signal, and another polarization plane is a receiving polarization plane, which is assigned to at least one receiving channel for receiving the examination signal; and
wherein the first and second polarization planes are fixed relative to the longitudinal axis of the housing and remain fixed during transmitting and receiving.

2. The locating device according to claim 1 comprising an integrally coupled grip element to enable an operator to move the locating device along a vertical surface.

3. The locating device according to claim 1, wherein the polarization plane creates an angle of ca. 45° with the longitudinal axis.

4. The locating device according to claim 1, wherein the polarization plane is a transmitting polarization plane in at least one operating mode, which is assigned to at least one transmitting channel for transmitting the examination signal.

5. The locating device according to claim 1, wherein the polarization plane is a receiving polarization plane in at least one operating mode, which is assigned to at least one receiving channel for receiving the examination signal.

6. The locating device according to claim 1, wherein the polarization planes are arranged orthogonally to each other.

7. The locating device according to claim 1, wherein the polarization planes are arranged obliquely to each other.

8. The locating device according to claim 1, wherein the second polarization plane is aligned parallel or orthogonally to the longitudinal axis.

9. The locating device according to claim 1, wherein the polarization unit provides at least two further polarization planes.

10. The locating device according to claim 1, wherein the polarization unit provides a rotation means, which is provided to set the alignment of at least one polarization plane relative to the longitudinal axis.

11. The locating device according to claim 1, wherein the locating device is constructed to fit within a chassis provided for guiding the locating unit over a surface of the examination object in a preferred moving direction, whereby the polarization plane is arranged relatively oblique to the preferred moving direction.

12. A procedure for locating an object that is arranged in an examination object with a locating device according to claim 1, comprising:
moving a quadrangular housing of the locating device over a surface of the examination object,
transmitting an examination signal fixedly relative to a longitudinal axis of the quadrangular housing;
polarizing the examination signal in a transmitting polarization plane by a transmitting polarization unit; and aligning the transmitting polarization unit obliquely to the longitudinal axis of the quadrangular housing.

13. The procedure according to claim 12, wherein the examination signal is received in at least one receiving polarization plane that is different from the transmitting polarization plane.

14. The procedure according to claim 13 wherein the examination signal is received in several receiving polarization plane that are different from the transmitting polarization plane.

15. The procedure according to claim 12 wherein the examination signal is received in the transmitting polarization plane.

16. The procedure according to claim 12 wherein the examination signal is received in the transmitting polarization plane and in at least one receiving polarization plane that is different from the transmitting polarization plane.

17. The procedure according to claim 16 wherein the examination signal is received in the transmitting polarization plane and in several receiving polarization planes that are different from the transmitting polarization plane.

18. The locating device according to claim 11, wherein the chassis further comprises a pathway sensor device for detecting the distance traveled by the locating device.

19. The locating device according to claim 1, wherein the locating device is moved along a vertical surface.

20. The locating device according to claim 19, wherein the locating device is moved along a wall.

21. The locating device according to claim 1, wherein the alignment of at least one polarization plane can be set using an actuator and wherein the actuator can be controlled by a control unit.

22. The procedure according to claim 12 wherein the surface of the examination object is vertical.

23. The procedure according to claim 12 wherein the surface of the examination object is a wall.

* * * * *

UNITED STATES PATENT AND TRADEMARK OFFICE
CERTIFICATE OF CORRECTION

| | | |
|---|---|---|
| PATENT NO. | : 8,686,891 B2 | Page 1 of 1 |
| APPLICATION NO. | : 12/809923 | |
| DATED | : April 1, 2014 | |
| INVENTOR(S) | : Krapf et al. | |

It is certified that error appears in the above-identified patent and that said Letters Patent is hereby corrected as shown below:

In the Claims

Column 10, line 63, claim 12, line 5 should read:

a surface of the examination object;

Signed and Sealed this
Fourth Day of November, 2014

Michelle K. Lee
*Deputy Director of the United States Patent and Trademark Office*